April 26, 1960     J. X. GREEN ET AL     2,934,733
POTENTIOMETER
Filed Dec. 9, 1957
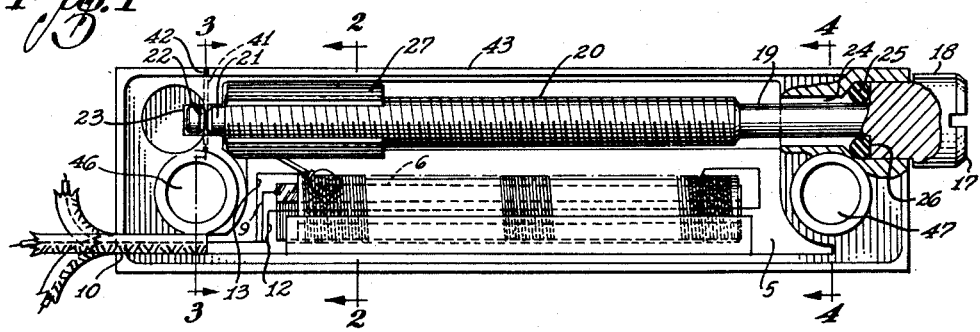
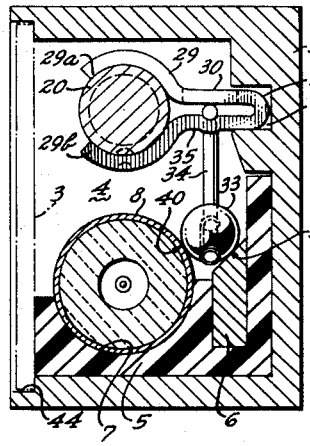
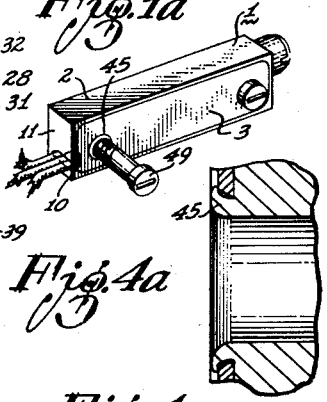
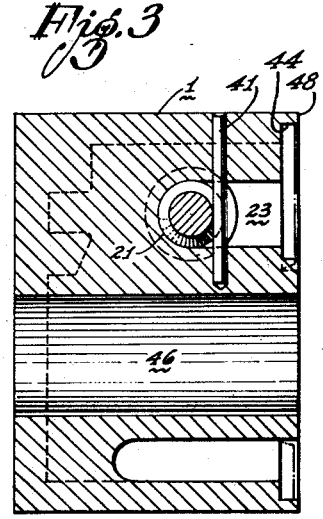
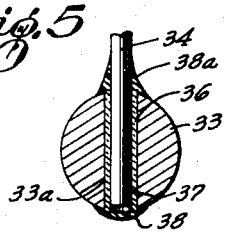
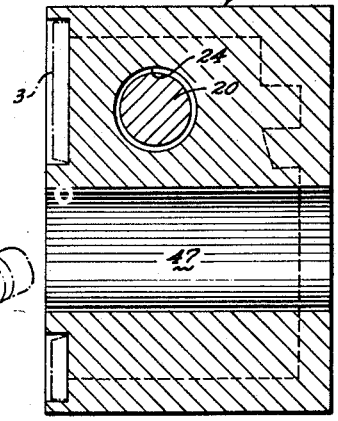
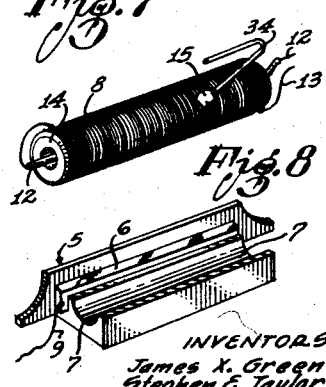
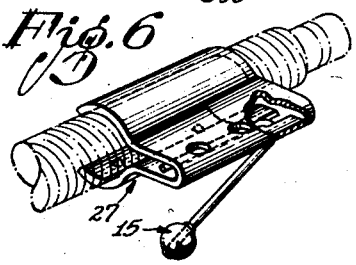
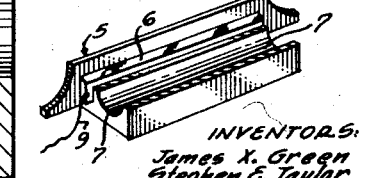
INVENTORS:
James X. Green
Stephen E. Taylor
Attorneys

2,934,733
POTENTIOMETER

James X. Green and Stephen E. Taylor, Burbank, Calif., assignors, by mesne assignments, to Airline Electric, Inc., Gardena, Calif., a corporation of California Application December 9, 1957, Serial No. 701,494

12 Claims. (Cl. 338—148)

This invention relates to rectilinear potentiometers, particularly of the miniature type.

In recent years, there has developed a considerable demand for miniature variable resistance units (potentiometers) for use in telemetering equipment, and in a wide variety of electronic control devices, such as those utilized in guided missiles, drone aircraft, space satellites, etc. Potentiometers employed in such equipment and devices must possess certain characteristics not demanded of variable resistance elements employed in stationary electronic apparatus, such as home radio and television sets, etc. Such required characteristics include the ability to maintain pre-set resistance values despite shock, acceleration through space, sudden severe changes in ambient temperature, humidity and air density, the ability to dissipate heat generated within the resistance element itself and the ability to be fabricated in such minute sizes that a number of them may be incorporated in an electronic device without substantial weight addition to the device, and at an economically feasible cost.

Potentiometers constructed in accordance with our invention attain these desired characteristics in that we provide a single spherical contact or brush element which is wedged between a rectilinear resistance unit and a conductive bar disposed parallel but at one angle to the resistance. This ball brush is held in such joint contacting position by a spring wire. The latter is seated in a traveling member which clamps upon the threading of an axially extending bolt or screw element, thereby permitting the disposition of the ball contact member to be varied longitudinally with respect to the rectilinear resistance element and the parallel contact bar. We further insulate the ball itself from its spring wire stem so that the spring wire carries no current.

The use of the spherical or ball brush has the advantage of decreasing the wear upon the resistance element, providing self adjusting contacts despite any mechanical misalignment of electrical and operational component parts, and of better dissipating any heat in the area surrounding the points of contact.

Further our novel arrangement by which contact is made between the resistance element and the conductor bar disposed parallel and angularly to each other by an insulated wire-supported spherical or ball brush, offers further advantages in that it provides a contact of extremely small size but of high pressure between the resistance element and the conductor bar, thereby to minimize the generation of electrical noise; it provides self-adjusting contacts despite any mechanical misalignment of electrical and/or operational parts; it provides a contact of extremely low moment of inertia or mass, to withstand high vibration; it provides low radio frequency loss and minimizes capacitance to ground by virtue of the diameter of the minute hole in the ball which separates the electrodes; it provides for inherent mechanical alignment since the contact ball is supported at three points disposed about the sphere, thereby reducing susceptibility to vibration in any axis to an absolute minimum; it provides a contact which, because of its spherical configuration, is less subject to corona discharge under high voltage and/or low ambient atmospheric pressure than contacts of other types; and further provides for extremely low loss, since only the diameter of the minute ball separates the last two mentioned electrodes.

The manner in which we support the ball brush contact by a wire from the traveling clip member affords the further advantage of providing positive axial positioning of the contact through a rigid member between the contact and the clip.

An additional feature of our inventive potentiometer structure lies in the disposition of resistance element itself in a body which is formed of a dielectric but heat conductive plastic material specially shaped to provide maximum dissipation of heat generated in the resistance coil. The plastic base also serves to insulate the resistance element from expansion of the cast metallic outer casing in which the entire unit is contained.

It is a still further feature of our potentiometer to provide zero end resistance, not, as is customary, by silvering the last few turns along the area over which the contacting element moves, but instead by silvering the back side of the turns away from the area of contact. This places the turns affected in parallel and gives substantially zero end resistance. Where silvering is provided along the area of contact, frequent movement of the contacting element over the silvered area on the coil will cause microscopic particles of silver to migrate to other portions of the coil, with resultant modification of the coil's resistance characteristics. This undesirable result is obviated in our novel potentiometer structure.

The resistance, conductor bar and other elements are enclosed and sealed in an oblong cast metallic casing to protect them from changes in environmental conditions. Because of the manner in which we dispose the several electrical and mechanical parts to enable them to be insulated from each other and from the outer metallic casing, the latter may be grounded or otherwise connected to provide electrostatic shielding of such parts from those of adjacently mounted units or from other components of the circuit in which our potentiometer may be connected.

The preferred embodiment of our invention is hereinafter described with reference to the accompanying drawings in which—

Figure 1 is a side elevation, partly broken away, of a potentiometer constructed in accordance with the principles of our invention;

Figure 1a is a perspective view of a potentiometer completely enclosed in its casing and provided with mounting screws;

Figure 2 is an enlarged section taken along the lines 2—2 of Figure 1, looking from right to left;

Figure 3 is an enlarged section along the lines 3—3 of Figure 1, looking from left to right;

Figure 4 is an enlarged section taken on the line 4—4 of Figure 1, looking from right to left;

Figure 4a is an enlarged detail of the area around the mounting hole on the left hand side of Figure 4;

Figure 5 is an enlarged detail of the manner in which we mount the contact ball brush on the end of the spring, as will be discussed more fully hereinafter;

Figure 6 is an enlarged detail of the slider assembly, including the contact ball and spring;

Figure 7 is a perspective view of the area of the resistance element which is traversed by the ball brush; and Figure 8 is a detailed perspective view of the plastic holder assembly.

Referring to Figures 1 and 1a, it may be seen that our novel potentiometer is enclosed in an oblong metallic casing 1, which is die-cast of zinc or aluminum in two parts, namely, a base housing 2 and a cover plate 3. The base housing 2 defines a cavity 4 in which are assembled the various elements which constitute the operative portion of our potentiometer.

The first of these parts, in the order of their assembly, is a block 5 which is preferably formed of diallyl phthalate or other heat conductive dielectric material. This plastic block 5 is formed about a metallic conductor bar 6 (see Figure 8) and includes a semi-cylindrical channel 7 adapted to receive a cylindrical resistance element 8 (Figure 7) which may be cemented therein. A wire 9 connecting the conductor bar 6 is brought out through an orifice 10 in the adjacent end 11 of the casing 2. Through the same orifice 10 we also bring out connecting wires 12 and 13 from the ends of the resistance element 8. The wire 13 may be brought out directly from the end of the unit 8 through the orifice 10. The wire 12, however, is first brought through the core of the unit 8 to the other end of the unit, so that the wire 12 may also be brought through the orifice 10. The resistance element 8 is wound about a glass core 14 and is composed of a suitable number of turns to give the desired resistance range. Each of the turns, of course, is suitably insulated from adjacent turns except that the last few turns at the left hand end (Figure 7) of the unit are silvered across the back (not shown) of the wire wound cylinder to place these turns in parallel. No silvering, however, extends around the front of the coil to the area thereof which would be contacted by the ball brush 15 which will hereafter be described more fully.

The entire resistance unit 8 is seated within the channel 16 in the plastic block 5, and the latter is then slipped into the cavity 4 defined by the base housing 2, as shown in Figure 2. At this time, the wires 9, 12 and 13 are appropriately brought out through the orifice 10.

We next provide a screw 17 or threaded element which includes a head 18, a neck 19, a threaded portion 20, and a bearing tip 21. The bearing tip 21 is annularly recessed at 22. The base housing 2 is recessed at 23 to receive the bearing tip of the screw 17, and is further orificed at 24 to enable the entire length of the screw 17 to be passed therethrough. Before mounting the screw in the base housing 2, we provide a seal 25 which is pressed against the underside 26 of the head portion 18 of the screw 17. The screw is mounted within the base housing 2 by inserting it through the orifice 24, bearing tip first. As the tip is passed through this orifice 24, we further insert it into a spring clip slider assembly 27. This is accomplished simply by turning the screw clockwise (as seen in Figure 2). The slider assembly is preferably formed of a single piece of spring metal which is bent back at 18 (Figure 2), to form a spring-biased clamping portion 29 which is adapted to clasp the threaded portion of the screw 20 as the screw is turned and threaded between the ends 29a and 29b of this portion of the slider member 27. The slider 27 also includes a flat guide section 30. The doubled back side 28 of this flat guide portion is adapted to fit within a longitudinally extending recess 31 provided in the right hand wall 32 (as seen in Figure 2) of the base housing 2.

To effect contact between the resistance element 8 and the conductor bar 6, we provide a ball 33 which is mounted to become a part of the slide assembly 27, by means of a spring 34. An end 37 of the latter is inserted in a bore 33a in the ball 33. The spring 34 is fixedly secured between the doubled back sides 30 and 35 of the slider 27. This spring is biased (see Figure 6) to press the ball 33 in between the conductor bar 6 and the resistance element 8.

To prevent the slider assembly and screw from carrying current or voltage from the conductor bar 6 or the resistance element 8, we insulate the ball 33 from the spring 34 in the manner shown in Figure 5, i.e. by providing a glass sleeve 36 which is fitted over the extremity 37 of the wire 34, and by sealing the ball 33 on to the thus sleeved tip 37 by means of a plastic dielectric material at opposite ends 38 and 38a of the bore through the ball 33.

When the screw 17 has been passed through the orifice 24, and also threaded into the slider assembly 27 so that the ball 33 is effectively wedged between the contact faces 39 and 40 of the conductor bar 6 and resistance element 8 respectively, the bearing tip 21 of the screw 17 is then inserted in the cavity or recess 23 shown on the left hand side of Figure 1. To prevent the screw from backing out of this position and to inhibit lateral displacement of the screw tip 21, we lock the screw in position by inserting a tiny screw 41 in an orifice 42 which is provided on the top 43 of the base housing 2. This minute screw 41 is threaded into this orifice 42 until its end extends past the channel 22 in the bearing tip 21 of the screw 17 as shown in Figure 3. The screw 17 then cannot be withdrawn to the right (as seen in Figure 1) until the screw 41 is unthreaded to the point where its end is withdrawn from the channel 22.

The potentiometer assembly is then completely encased by fitting into the seating 44, defined by the edges 48, the base housing 2 (see Figures 2 and 3), the cover plate 3. This cover plate also fits over annular protrusions 45 (Figure 4a) which extend outwardly of the base housing 2 at each end, and define in part holes 46 and 47 through the base housing which holes are provided to facilitate mounting of the unit. When the cover plate 3 is thus fitted in the seating 44 and over the protrusions 45, it fits flushly within the rectangular perimeter 48 effectively to seal the electrically operating parts within the cavity 4. The plate 3 may be sealed in the seating 44 or it may be held in position simply by mounting screws 49.

From the foregoing description of the preferred embodiment of our invention, it may readily be seen that our novel miniature potentiometer may be easily and economically constructed and assembled, yet it provides excellent electrical contact between the electrode and resistance element. As a consequence of insulating the ball from the slider, a metal slider and screw may be employed if desired, but voltage breakdown through arcing is prevented since the slider is not in contact with any voltage source. Further our ball brush provides sound contact with the resistance element but minimizes wear on the latter. The particular arrangement of the plastic base block and its composition further serves to support the resistance element while dissipating heat generated by the passage of current through it. Moreover, the silvering of the backs of the wire turns away from the points of contact with the ball brush affords the desired turn shorting while avoiding migration of silver particles and consequent charging of electrical characteristics of the resistance element.

These and other advantages obvious to one skilled in the art are attained by our novel potentiometer.

We claim:

1. A potentiometer comprising a metallic housing and a cover plate, said housing defining a cavity extending longitudinally within said housing, and said cover plate being adapted to close and seal said cavity, a base block of heat dissipating, dielectric, plastic material, said base block being adapted to fit securely within and to fill longitudinally a portion of said cavity, said base block further having embedded lengthwise within it a conductor bar one side of which is presented for electrical contact, a recess extending longitudinally in said block, said recess being disposed parallel and adjaecnt to, but apart from, the said side of the bar, a resistance element adapted to fit within said cavity, to be seated in said recess and to present a contact portion extending parallel to said bar side but spaced therefrom, a threaded element, the last said element having a head, a threaded section and a tip, said housing being orificed at one end to pass said threaded element therethrough, said head projecting through said orifice in the housing, and said threaded section being disposed within said cavity parallel to, but spaced apart from said bar and resistance element, said housing further having a recess in its wall at the opposite end from the orifice to receive said tip, a slider, said slider having upper and lower clamping portions originating from a flange and being adapted to fit about the said threaded section, said clamping portions being spring-biased to grip said threaded section firmly but allowing the latter to be screwed through said clamping portions, said housing having a further longitudinal recess adjacent said threaded element to accommodate said flange as the slider is moved along the threaded element and to prevent rotation of the slider about the axis of the last said element, a bent wire spring secured to and extending from the slider toward the space between the said bar side and resistance element, an electrically conductive ball disposed upon the end of said spring wire but insulated therefrom, said spring wire serving to press said ball into simultaneous contact with both the bar and resistance element, separate insulated connection means extending from the bar and from opposite extremities of the resistance element, said housing being further orificed to permit the last said means to be brought out of the cavity to external connections.

2. A potentiometer comprising a metallic housing and a cover plate, said housing defining a cavity extending longitudinally within said housing, and said cover plate being adapted to close and substantially seal said cavity, a base block of heat dissipating, dielectric, plastic material, said base block being adapted to fit securely within and to fill longitudinally a portion of said cavity, said base block further having embedded lengthwise within it a conductor bar one side of which is disposed at an angle and is presented for electrical contact, a recess extending longitudinally in said block, said recess being disposed parallel and adjacent to, but apart from, the said side of the bar, a resistance element adapted to fit within said cavity, to be seated in said recess and to present a contact portion extending parallel to said bar side but spaced therefrom, a threaded element, the last said element having a head, a threaded section and a tip, said housing being orificed at one end to pass said threaded element longitudinally therethrough, said head projecting through said orifice in the housing, and said threaded section being disposed within said cavity parallel to, but spaced apart from said bar and resistance element, said housing further having a recess in its wall at the opposite end from the said orifice to receive said tip, a slider, said slider having upper and lower clamping portions originating from a flange and being adapted to fit about the said threaded section, said clamping portions being spring-biased to grip said threaded section firmly but allowing the latter to be screwed through said clamping portion, said housing having a further longitudinal recess adjacent said threaded element to accommodate said flange as the slider is moved along the threaded element and to prevent rotation of the slider about the axis of the last said element, a wire spring secured to and extending from the slider toward the space between the said bar side and resistance element, an electrically conductive ball disposed upon the end of said spring wire but insulated therefrom, said spring wire serving to press said ball into simultaneous contact with both the bar and resistance element to effect an electrical connection therebetween, separate insulated connection means extending from the bar and from opposite extremities of the resistance element, said housing being further orificed to permit the last said means to be brought out of the cavity to external connections.

3. The potentiometer as described in claim 2 wherein the base block is molded of diallyl phthalate.

4. The potentiometer as described in claim 2 wherein the resistance element is formed of a wire wound on a cylindrical glass core.

5. The potentiometer as described in claim 2 wherein the last few turns of the wire winding are provided with a conductive coating to interconnect said windings along an area on the back side of the turns away from the points of contact of said ball, thereby to place said turns in parallel to provide substantially zero end resistance.

6. The potentiometer as described in claim 2 wherein the ball contact is formed of a precious metal alloy and is bored through an axis thereof, and the spring wire is provided with a glass sleeve on its end, the bore through the ball being of such diameter as to accommodate the outside diameter of the glass sleeve, and a dielectric plastic material is further provided to secure said ball upon the said sleeved tip of said spring wire to insulate the ball from the wire spring.

7. A potentiometer comprising a metallic housing, said housing defining a cavity extending longitudinally within said housing, and a covering fitting on said housing adapted to close said cavity, a conductor bar disposed longitudinally in said cavity and insulated from said housing, said conductor bar having an exposed longitudinally extending contact surface, a resistance element mounted in said housing and also insulated therefrom, said resistance element being spaced apart from said conductor bar but disposed close and parallel to the latter to present a contact surface adjacent the conductor bar contact surface, screw means extending through at least one wall of said casing and disposed parallel to but spaced apart from both the conductor bar and the resistance element, said screw means having a threaded portion disposed within said cavity, carrier means disposed on said threaded portion of said screw means and movable longitudinally in said cavity upon turning of said screw means, spring means extending from said carrier toward the space between said two contact surfaces, a metallic contact element, the last said element presenting a spherical contacting surface adapted to extend simultaneously between both the conductor bar contact surface and the resistance element contact surface, said contact element further being supported by said spring means and urged thereby in a direction to effect such simultaneous contact between said conductor bar and resistance element contact surfaces, said spring means securing said metallic contact element against rotation relative to said bar and said resistance element, said metallic contact element being insulated from said carrier means, and insulated connecting means extending from each of the opposite extremities of the resistance element and from the conductor bar, the last said insulated means being brought out through said housing for external circuit connection.

8. The potentiometer as described in claim 7 wherein the metallic contact element is a sphere of precious metal alloy which is orificed, the spring means is a wire, the tip of said wire being provided with an insulated covering, and said tip is inserted in the orifice in said spherical element.

9. The potentiometer described in claim 7 wherein the carrier means is a metallic clip which is clamped over the threaded portion of said screw, and means are provided to prevent rotation of said clip about the axis of said screw.

10. A potentiometer as described in claim 7 wherein the resistance element is comprised of an insulated tubular mandrel upon which a resistance wire is wound and one of the connecting means is brought through the hollow core of said mandrel.

11. A potentiometer comprising a metallic housing, said housing defining a cavity extending longitudinally within said housing, and a covering fitting on said housing adapted to close said cavity, a conductor bar disposed longitudinally in said cavity and insulated from said housing, said conductor bar having an exposed longitudinally extending contact surface, a resistance element mounted in said housing and also insulated therefrom, said resistance element being spaced apart from said conductor bar but disposed close and parallel to the latter to present a contact surface adjacent the conductor bar contact surface, screw means extending through at least one wall of said casing and disposed parallel to but spaced apart from both the conductor bar and the resistance element, said screw means having a threaded portion disposed within said cavity, carrier means disposed on said threaded portion of said screw means and movable longitudinally in said cavity upon turning of said screw means, spring means extending from said carrier toward the space between said two contact surfaces, a metallic contact element, the last said element presenting a spherical contacting surface adapted to extend simultaneously between both the conductor bar contact surface and the resistance element contact surface, said contact element further being supported by said spring means and urged thereby in a direction to effect such simultaneous contact between said conducting bar and resistance element contact surfaces, said spring means securing said metallic contact element against rotation relative to said bar and said resistance element, said metallic contact element being insulated from said carrier means, and insulated connecting means extending appropriately from the resistance element and conductor bar to provide external circuit connections, the last said insulated means being brought out through and insulated from said housing.

12. A potentiometer comprising: an electrically conductive surface; a resistance element, said element having a contact surface of varying resistance, said contact surface being disposed parallel to but spaced from the conductive surface; a screw element, said screw element being disposed parallel and adjacent to, but spaced from both said surfaces; a contacting member, said member being of conductive material and presenting a convex surface of sufficient extent and radius of curvature to bridge the spacing between said conductive and contact surfaces, and to make substantially tangential contact therewith; means adapted to travel axially along said screw upon rotation of the latter; a spring element, said spring element being supported by said means and itself supporting said member to urge the latter into continuous sliding contact with said conductive and contact surfaces, said spring element further being so secured to said member as to prevent the latter from rotating relative to either said conductive surface or said contact surface; housing means enclosing and supporting said conductive surface, said resistance element and said screw with its travel means and spring urged contacting member; and electrical conduits extending from said conductive and contact surfaces of said housing to enable the last said surface to be connected to an external circuit.

References Cited in the file of this patent

UNITED STATES PATENTS

| | | |
|---|---|---|
| 1,433,740 | Nagel | Oct. 31, 1922 |
| 1,940,102 | Roberton | Dec. 19, 1933 |
| 2,523,896 | Bartolome | Sept. 26, 1950 |
| 2,761,045 | Matthew | Aug. 28, 1956 |
| 2,823,288 | Bourns et al. | Feb. 11, 1958 |
| 2,860,216 | Hubbard et al. | Nov. 11, 1958 |

FOREIGN PATENTS

| | | |
|---|---|---|
| 354,754 | Great Britain | Aug. 6, 1931 |